United States Patent
Akenine-Möller et al.

(10) Patent No.: US 9,218,678 B2
(45) Date of Patent: Dec. 22, 2015

(54) MULTI-VIEW RASTERIZATION USING AN ANALYTICL VISIBILITY FUNCTION

(75) Inventors: Tomas G. Akenine-Möller, Lund (SE); Magnus Andersson, Helsingborg (SE); Bjorn Johnsson, Eslöv (SE)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 13/093,190

(22) Filed: Apr. 25, 2011

(65) Prior Publication Data

US 2012/0269423 A1    Oct. 25, 2012

(51) Int. Cl.
G06K 9/00 (2006.01)
G06T 17/00 (2006.01)
G06T 11/40 (2006.01)
H04N 13/02 (2006.01)

(52) U.S. Cl.
CPC ............ *G06T 11/40* (2013.01); *H04N 13/0275* (2013.01); *H04N 13/0282* (2013.01)

(58) Field of Classification Search
None
See application file for complete search history.

(56) References Cited

U.S. PATENT DOCUMENTS

| | | | |
|---|---|---|---|
| 6,211,882 B1 * | 4/2001 | Pearce et al. | 345/419 |
| 6,999,100 B1 * | 2/2006 | Leather et al. | 345/611 |
| 7,446,780 B1 * | 11/2008 | Everitt et al. | 345/611 |
| 7,791,605 B2 | 9/2010 | Jiao et al. | |
| 8,139,058 B2 * | 3/2012 | Cai et al. | 345/419 |
| 8,179,399 B2 | 5/2012 | Barone | |
| 2005/0195197 A1 * | 9/2005 | Wolfe | 345/505 |
| 2006/0268005 A1 * | 11/2006 | Hutchins et al. | 345/606 |
| 2007/0103465 A1 * | 5/2007 | Barenbrug et al. | 345/426 |
| 2008/0074098 A1 * | 3/2008 | Vranish | 324/76.11 |
| 2008/0273028 A1 * | 11/2008 | Jiao et al. | 345/420 |
| 2009/0174704 A1 * | 7/2009 | Sellers | 345/419 |
| 2010/0328303 A1 * | 12/2010 | Akenine-Moller et al. | 345/419 |
| 2011/0234609 A1 * | 9/2011 | Cai et al. | 345/581 |
| 2012/0081357 A1 * | 4/2012 | Habbecke et al. | 345/419 |
| 2012/0177287 A1 * | 7/2012 | Gribel et al. | 382/165 |
| 2012/0218264 A1 * | 8/2012 | Clarberg et al. | 345/420 |
| 2012/0269423 A1 * | 10/2012 | Akenine-Moller et al. | 382/154 |
| 2012/0269433 A1 * | 10/2012 | Fan et al. | 382/173 |

FOREIGN PATENT DOCUMENTS

SE    WO2007064280    * 11/2006

OTHER PUBLICATIONS

"Rasterization" Wikipedia, Available online at http://en.wikipedia.org/wiki/Rasterisation, Date accessed Feb. 10, 2014.*
Carl Johan Gribel, Michael C. Doggett, Tomas Akenine-Möller: Analytical motion blur rasterization with compression. High Performance Graphics Jun. 2010: 163-172.*
Sung K., Pearce A., Wang C.: Spatial-Temporal Antialiasing. IEEE Transactions on Visualization and Computer Graphics, 8, 2 (2002), 144-153.*

(Continued)

*Primary Examiner* — Tahmina Ansari
(74) *Attorney, Agent, or Firm* — Trop, Pruner & Hu, P.C.

(57) ABSTRACT

Multi-view rasterization may be performed by calculating visibility over a camera line. Edge equations may be evaluated iteratively along a scanline. The edge equations may be evaluated using single instruction multiple data instruction sets.

30 Claims, 4 Drawing Sheets

(56) References Cited

OTHER PUBLICATIONS

Akenine-Möller, Tomas, Jacob Munkberg, and Jon Hasselgren. "Stochastic rasterization using time-continuous triangles." Graphics Hardware. 2007.*

PCT/US2012/033882 International Search Report with Written Opinion of the International Searching Authority mailed Oct. 18, 2012 (9 pgs).

Gribel, Carl J. et al., "Analytical Motion Blur Rasterization with Compression," High Performance Graphics, 2010, (10 pgs).

Akenine-Moller T., Munkberg J., Hasselgren J.: Stochastic Rasterization using Time-Continuous Triangles. In Graphics Hardware (2007), pp. 7-16. 2.

Catmull E.: An Analytic Visible Surface Algorithm for Independent Pixel Processing. In Computer Graphics (Proceedings of ACM SIGGRAPH 84) (1984), pp. 109-115. 1, 2.

Cook R. L., Carpenter L., Catmull E.: The Reyes Image Rendering Architecture. In Computer Graphics (Proceedings of ACM SIGGRAPH 87) (1987), pp. 95-102. 1, 2.

Deering M., Winner S., Schediwy B., Duffy C., Hunt N.: The Triangle Processor and Normal Vector Shader: A VLSI System for High Performance Graphics. In Computer Graphics (Proceedings of ACM SIGGRAPH 88) (1988), pp. 21-30. 1.

Grant C. W.: Integrated Analytic Spatial and Temporal Anti-Aliasing for Polyhedra in 4-Space. In Computer Graphics (Proceedings of ACM SIGGRAPH 85) (1985), pp. 79-84. 1, 2.

Haeberli P., Akeley K.: The Accumulation Buffer: Hardware Support for High-Quality Rendering. In Computer Graphics (Proceedings of ACM SIGGRAPH 90) (1990), pp. 309-318.1.

Korein J., Badler N.: Temporal Anti-Aliasing in Computer Generated Animation. In Computer Graphics (Proceedings of ACM SIGGRAPH 83) (1983), pp. 377-388. 1, 2, 9.

Ragan-Kelley J., Lehtinen J., Chen J., Doggett M., Durand F.: Decoupled Sampling for Real-Time Graphics Pipelines. Tech. Rep. MIT-CSAIL-TR-2010-015, Mar. 29, 2010. 2, 10.

Extended European Search Report and Written Opinion issued in corresponding EP12777772.0/1906/2702584 dated Feb. 13, 2015 (10 pages).

Akenine-Moller, T.G., et al, "Stochastic Rasterization Using Time-Continuous Triangles," Graphics Hardware, Jan. 1, 2007, Section 3.3.2, Time-Dependent Edge Functions, retrieved from the Internet: URL: http://dx.doi.org/10.2312/EGGH/EGGH07/007-016, 12 pages.

Andersson, M., et al., "Efficient Multi-View Ray Tracing Using Edge Detection and Shader Reuse," The Visual Computer, International Journal of Computer Graphics, Springer, Berlin, Germany, vol. 27, No. 6-8, Apr. 22, 2011, 12 pages.

Gribel, C. J., et al., "Analytical Motion Blur Rasterization with Compression," Jan. 1, 2010, Retrieved from the Internet: URL: http://dx.doi.org/10.2312/EGGH/HPG10/163-172, 10 pages.

Hasselgren, J., et al., "An Efficient Multi-View Rasterization Architecture," Proceedings of the 17th Eurographics Conference on Rendering Techniques, Jun. 26, 2006, 12 pages.

TW Office action in corresponding application No. 101113961 dated May 26, 2015 [w/English translation], (4 pages).

* cited by examiner

MULTI-VIEW RASTERIZATION USING AN ANALYTICL VISIBILITY FUNCTION

BACKGROUND

This relates generally to computers and, particularly, to graphics processing.

There is a shift in technology in displays, and 3D displays and 3D TV are becoming mainstream, while 3D in cinemas is already widespread around the world. The next Nintendo handheld gaming device, the Nintendo 3DS, will have an autostereoscopic display. Furthermore, public stereo TV was launched in January 2010 in South Korea, and advertising companies are using 3D displays more and more. All in all, it is clear that 3D displays are a hot area, but there are very few specialized algorithms for 3D graphics for such displays.

DETAILED DESCRIPTION

An optimized rasterization algorithm may be used for stereoscopic and 3D multi-view graphics. The algorithm is based on analytical computations, which is in contrast to standard rasterization for multi-view graphics which uses either accumulation buffering-like techniques or stochastic rasterization. In order to render real-time graphics for stereo or multi-view displays, rather high quality is desirable, especially for objects that are out of focus. Current solutions do not solve this in a good way, because reaching high quality in these difficult regions is very costly in terms of computations and memory bandwidth usage.

In the following, bold characters are vectors (x,y,w) in homogeneous 2D space. It is well known that a time-continuous edge equation can be written as:

$$e(t)=a(t)x+b(t)y+c,$$

for an edge through two vertices, $p_1$ and $p_0$, where $$(a,b,c)=(p_1 \times p_0)=t^2 f+tg+h,$$

under the assumption that a vertex moves linearly:

$$p_i(t)=(1-t)q_i+tr_i.$$

The vectors f, g, and h are computed as:

$$f=(r_1-q_1) \times (r_0-q_0)$$

$$g=q_1 \times (r_0-q_0)+(r_1-q_1) \times q_0$$

$$h=q_1 \times q_0$$

If you focus on a single pixel, it can be shown that the edge equation for motion blur becomes:

$$e(t)=\alpha t^2+\beta t+\gamma.$$

Figure 1:
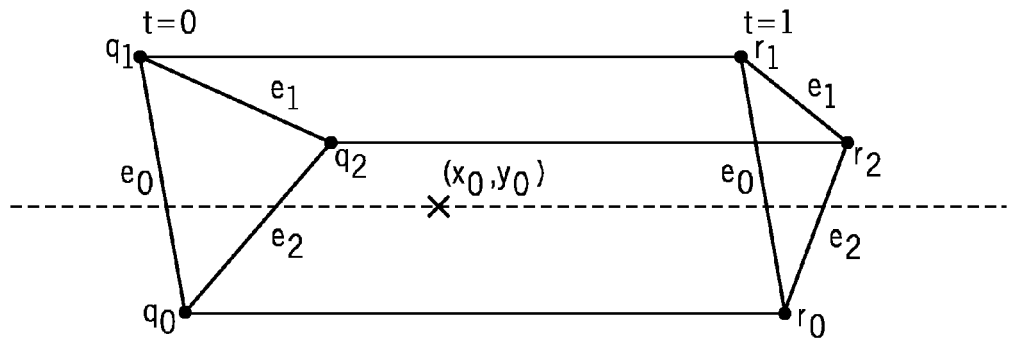
FIG. 1 is a triangle at start position t=0 and another triangle at start position t=1 in accordance with one embodiment of the present invention.

Note that $q_{iy}=r_{iy}$ and $q_{iw}=r_{iw}$, (for a multi-view setting). That is, the y-coordinates and w-coordinates for a moving vertex, $p_i(t)$, are the same for the start position, $q_i$ and end position, $r_i$, as described in FIG. 1. Due to these constraints, $r_0-q_0=(r_{0x}-q_{0x}, 0, 0)$ and $r_1-q_1=(r_{1x}-q_{1x}, 0, 0)$, and we use that to optimize the calculations for f and g above. For the highest degree term, namely f, this is advantageous since f=(0,0,0). When simplifying the expression for g, we arrive at: $g=(0, q_{1w}(r_{0x}-q_{0x})-q_{0w}(r_{1x}-q_{1x}), q_{0y}(r_{1x}-q_{1x})-q_{1y}(r_{0x}-q_{0x}))$, while $h=q_1 \times q_0$ remains an arbitrary vector.

So in summary, we obtain:

f=(0,0,0), $g=(0, q_{1w}(r_{0x}-q_{0x})-q_{0w}(r_{1x}-q_{1x}), q_{0y}(r_{1x}-q_{1x})-q_{1y}(r_{0x}-q_{0x}))$, and $h=q_1 \times q_0$.

This is considerably less expensive to compute than the previous expressions for generalized motion blur. These computations would be done in a triangle setup, and while it is beneficial to have a faster triangle setup, the real gains comes from the fact that root finding becomes much faster with our equations. This is so because f=(0,0,0), which means that $e(t)=\alpha t^2+\beta t+\gamma$ becomes $e(t)=\alpha t+\beta$, i.e., a first degree polynomial instead of a second degree polynomial (note that $\alpha$ and $\beta$ are not necessarily the same $\alpha$ and $\beta$ in the second degree polynomial). So in our optimized situation, the parameters, (a,b,c), for the edge equation becomes:

$$(a,b,c)=(h_x g_y t+h_y g_z t+h_z)$$

As can be seen, a is no longer a function of t, and intuitively, this can be understood by making an analogue to non-homogenous edge equations, where n=(a,b) is the "normal" of the edge. This normal is computed as $n=(a,b)=(-(y_1-y_0), x_1-x_0)$, where $(x_0, y_0)$ and $(x_1, y_1)$ are the screen space vertices of the edge. As can be seen, a only depends on the y-components, and for the multi-view case, the y-coordinates remain the same for all t, as we have seen above. The conclusion becomes that a must be constant.

For a particular sample point, $(x_0,y_0)$, the edge equation becomes:

$$e(t)=t(g_y y_0+g_z)+(h_x x_0+h_y y_0+h_z)=\alpha t+\beta.$$

Figure 2:
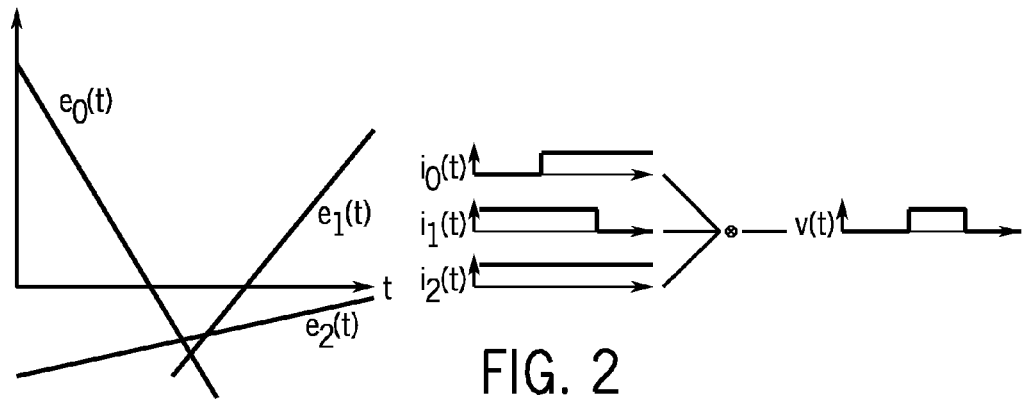
FIG. 2 is a plot of edge equations versus time and showing a sample point inside the triangle throughout the interval v(t)=1 in accordance with one embodiment.

The inside function, i(t), equals 0 if e(t)>0 and 1 otherwise. The visibility function is defined as $v(t)=i_0(t)\, i_1(t)\, i_2(t)$, as described by Gribel et al. "Analytical Motion Blur Rasterization With Compression," High-Performance Graphics, pp. 163-172, 2010. The sample point is inside the triangle throughout the interval where v(t)=1, as can be seen in FIG. 2.

The second degree nature of time-continuous edge equations makes it possible for a triangle to cover multiple spans throughout t for each sample. In contrast to this, thanks to the first degree characteristic of the multi-view edge functions, the visibility function will only be v(t)=1 for one contiguous interval in t, which simplifies the algorithm further.

Let us now focus on a particular scanline with y=y0, and let x vary along this scanline. In this case, we arrive at a simplified edge equation:

$$e(x,t)=\alpha t+\gamma+h_x x,$$

where $\alpha=g_y y_0+g_z$, and $\gamma=h_y y_0+h_z$.

Let us look at what happens for two neighboring pixels, (x, $y_0$) and (x+1, $y_0$), and solve for t in $e(x,t_0)=0$ and $e(x+1,t_2)=0$:

$$t_0=(-\gamma-h_x x)/\alpha,$$

$$t_1=t_0-h_x/\alpha.$$

Figure 3:
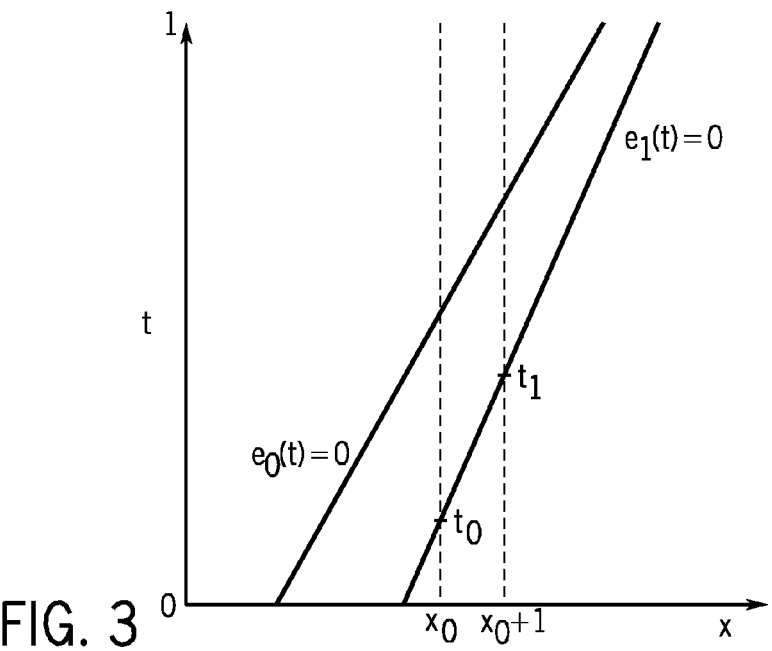
FIG. 3 is a depiction of x,y coordinates in an epipolar plane at $y_0$ in accordance with one embodiment.

This can be visualized in the epipolar plane at $y_0$, as shown in FIG. 3.

Based on these observations, we devise a new algorithm for quick analytical rasterization for multi-view graphics. There are several different embodiments here.

Starting values for t for each edge equation for n scanlines are computed, and with a single instruction multiple data (SIMD) width of n, we compute the next n t-values with SIMD instructions.

Figure 4:
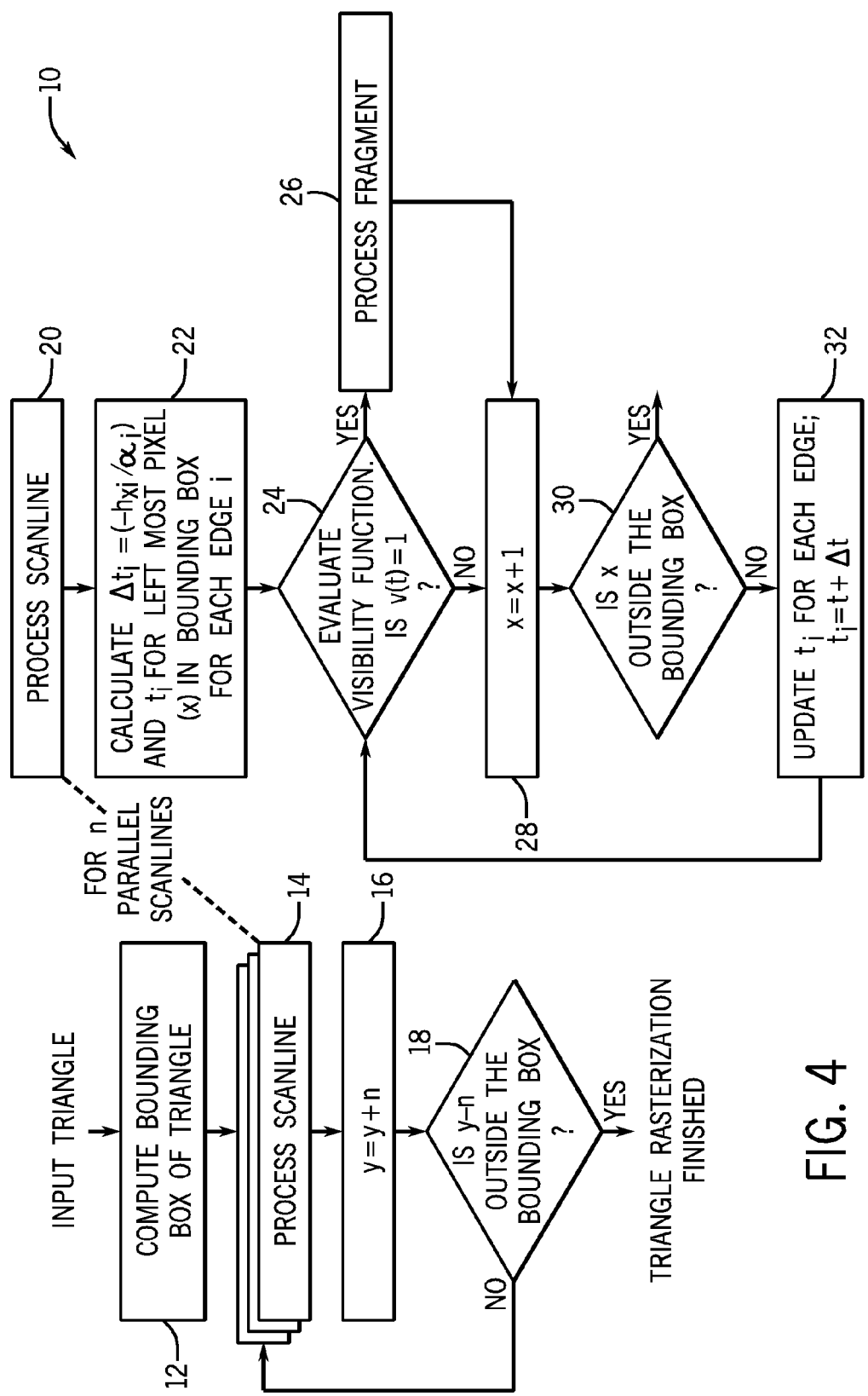
FIG. 4 is a pair of flow charts for an algorithm for quick analytical rasterization of multi-view graphics in accordance with one embodiment.

In one embodiment of the algorithm, shown in FIG. 4, an incoming triangle is bounded in screen space (block 12), and n scanlines are processed in parallel (block 14). For each scanline (block 20), initial t values are calculated for the left most pixel in the bounding box (block 22). Additionally, $\Delta t = hx/\alpha$ is calculated, which is used to increment t. Next, a loop is entered where each of the pixels covered by the bounding box and scanline are processed in left-to-right order. The visibility function is evaluated for each pixel (block 24), and if the test passes, the pixel fragment is processed (block 26). This processing could, for example, encompass some shading integral approximation of the triangle at (x, y, [t0, t1)) through point sampling. The variable x is incremented in block 28 and a check at block 30 determines if x is outside the bounding box. If not, $t_i$ is updated for each edge, where $t_i = t_i + \Delta t$ (block 32). Otherwise, the pixel is ignored, because rasterization is finished on that scanline.

At block 16, y is set equal to y+n. A check at block 18 determines if y-n is outside the bounding box. If so, triangle rasterization is finished and, otherwise, the flow iterates back to processing scanlines.

Figure 5:
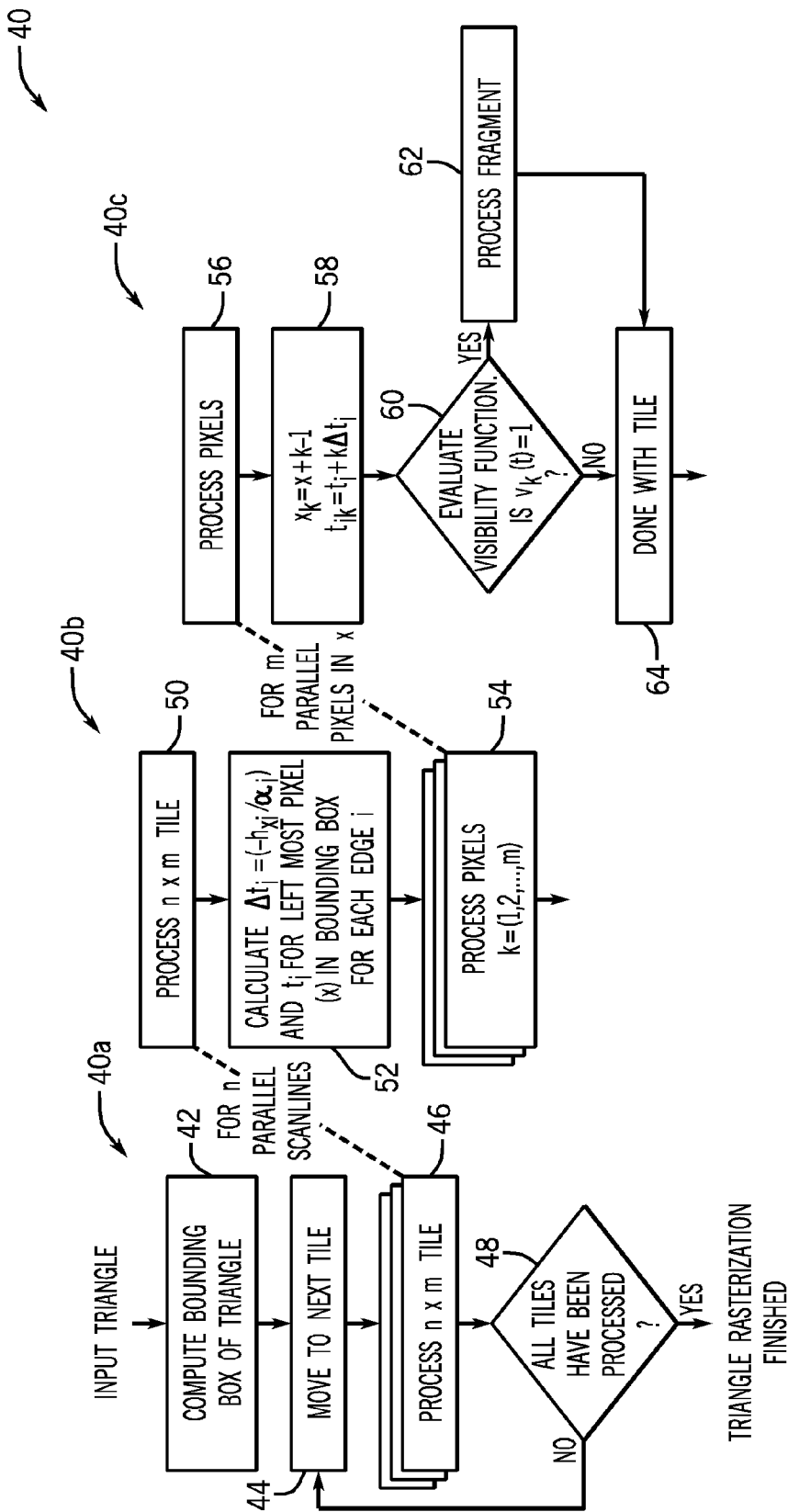
FIG. 5 shows a plurality of flow charts in accordance with another embodiment of the present invention.

In another embodiment of the algorithm, shown in FIG. 5, tiles of size m×n are processed at a time as shown in the initial flow on the left labeled 40a. A triangle is received and the bounding box of the triangle is computed as indicated in block 42. Then in block 44 the flow moves to the next tile. For each tile, the tile is processed as indicated in block 46 and middle flow 40b.

First, in flow 40b, for each of the n scanlines, initial t values are calculated, as well as the $\Delta t = hx/\alpha$ increments (block 52). Then x- and t-values for all pixels in the tile are computed in parallel (flow 40b, block 54, flow 40c, blocks 56 and 58). The visibility function is also evaluated in parallel, flow 40c block 60, and, on success, the surviving samples are processed (block 62) (as described in the previous embodiment, flow 40a, blocks 44-48). Otherwise, the tile is done (block 64).

Then the flow returns to the left most flow 40a in FIG. 5 and a check at diamond 48 determines whether all the tiles have been processed. If not the flow iterates back to block 44 and otherwise rasterization is finished.

By solving the multi-view rasterization problem analytically, we avoid all types of noise in terms of visibility, in some embodiments. In some embodiments, the quality in terms of visibility is exact, i.e., it cannot be improved beyond our solution.

We also devise a technique for efficiently traversing a multi-view triangle. After some mathematics, we came to the conclusion that only simple adds are needed to traverse from one pixel to the neighboring pixel (in x), and this makes our traversal algorithms (we have two different embodiments) particularly fast.

We use analytical visibility computations over the camera line, instead of point sampling. We developed specialized edge equations that are fast to evaluate iteratively along a scanline, or over multiple scanlines using a SIMD instructions set. All of this makes for a very fast algorithm with high quality, in some embodiments.

Figure 6:
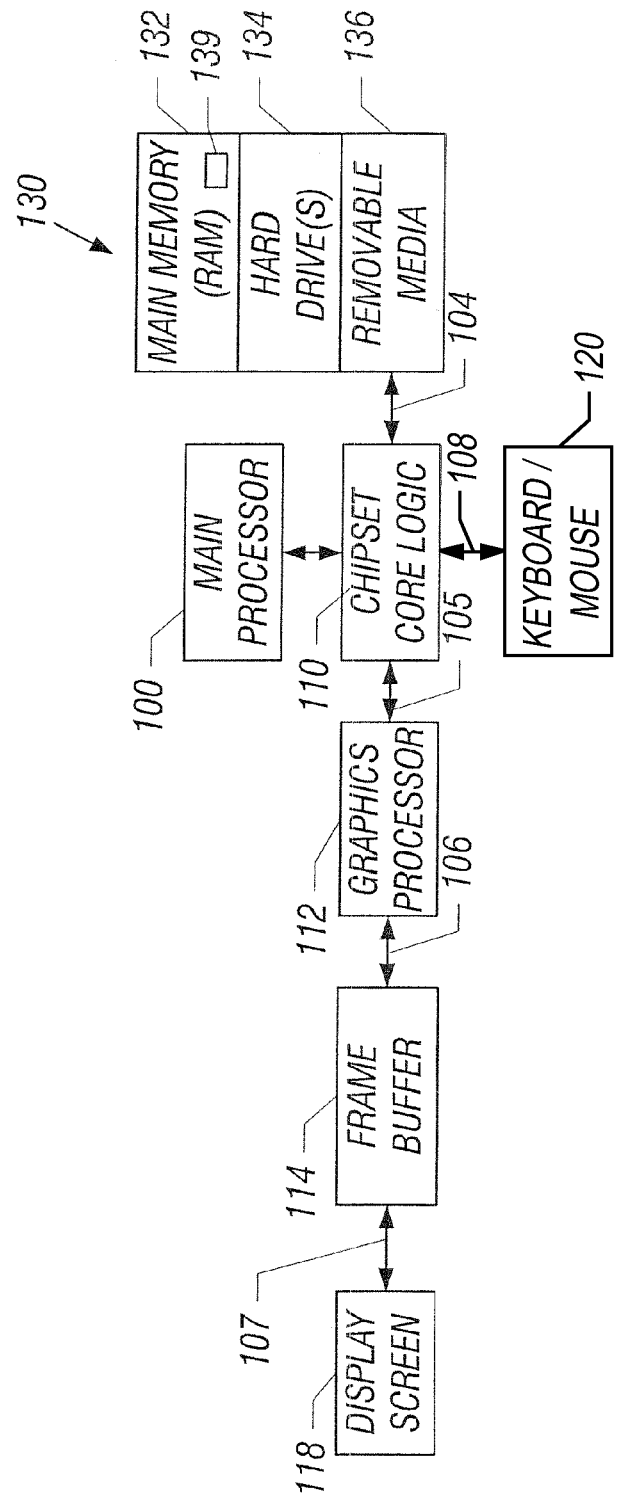
FIG. 6 is a schematic depiction for one embodiment of the present invention.

The computer system 130, shown in FIG. 6, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 4 or 5 may be stored in a non-transitory machine or computer readable medium, such as the memory 132, and/or the graphics processor 112, and/or the central processor 100 and may be executed by the processor 100 and/or the graphics processor 112 in one embodiment.

FIGS. 4 and 5 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 4 and 5.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    performing multi-view rasterization for three-dimensional display by calculating an analytical visibility function over a camera line by solving time continuous edge equations using a first degree polynomial.
2. The method of claim 1 including determining an interval when a sample point is inside a triangle throughout the interval.

3. The method of claim 2 including evaluating edge equations iteratively along a scanline.

4. The method of claim 3 including traversing a multi-view triangle from one pixel to a neighboring horizontal pixel using only simple additions.

5. The method of claim 4 including processing a plurality of scanlines in parallel.

6. The method of claim 4 including processing the pixels in a tile, one tile at a time.

7. The method of claim 6 including calculating values for pixels in the tile in parallel.

8. The method of claim 2 including evaluating edge equations using multiply-and-add operations along a scanline.

9. The method of claim 8 including processing a plurality of scanlines in parallel.

10. The method of claim 8 including processing the pixels in a tile, one tile at a time.

11. The method of claim 10 including calculating values for pixels in the tile in parallel.

12. A non-transitory computer readable medium storing instructions to enable a computer to:
    perform multi-view rasterization for three-dimensional display by calculating an analytical visibility function over a camera line by solving time continuous edge equations using a first degree polynomial.

13. The medium of claim 12 further storing instructions to determine an interval when a sample point is inside a triangle throughout the interval.

14. The medium of claim 12 further storing instructions to evaluate edge equations iteratively along a scanline.

15. The medium of claim 14 further storing instructions to traverse a multi-view triangle from one pixel to a neighboring horizontal pixel using only simple additions.

16. The medium of claim 15 further storing instructions to process a plurality of scanlines in parallel.

17. The medium of claim 16 further storing instructions to perform a visibility test on a pixel and process a pixel fragment if the visibility test passes.

18. The medium of claim 13 further storing instructions to evaluate edge equations using multiply-and-add operations along a scanline.

19. The medium of claim 18 further storing instructions to process a plurality of scanlines in parallel.

20. The medium of claim 18 further storing instructions to process the pixels in a tile, one tile at a time.

21. The medium of claim 20 further storing instructions to calculate values for pixels in the tile in parallel.

22. A system comprising:
    a processor to perform multi-view rasterization for three-dimensional display by calculating an analytical visibility function over a camera line by solving time continuous edge equations using a first degree polynomial; and
    a storage coupled to said processor.

23. The system of claim 22 wherein said processor is a graphics processing unit.

24. The system of claim 23 wherein said graphics processing unit to use a single instruction multiple data instruction set.

25. The system of claim 22, said processor to determine an interval when a sample point is inside a triangle throughout the interval.

26. The system of claim 22, said processor to evaluate edge equations iteratively along a scanline.

27. The system of claim 26, said processor to traverse a multi-view triangle from one pixel to a neighboring horizontal pixel using only simple additions.

28. The system of claim 27, said processor to process a plurality of scanlines in parallel.

29. The system of claim 28, said processor to perform a visibility test on a pixel and process a pixel fragment if the visibility test passes.

30. The system of claim 22, said processor to calculate values for pixels in the tile in parallel.

* * * * *